(12) United States Patent
Hadad et al.

(10) Patent No.: US 7,821,786 B2
(45) Date of Patent: Oct. 26, 2010

(54) LAPTOP STAND

(76) Inventors: Christopher P. Hadad, 15 Holly Mews, Berkeley Heights, NJ (US) 07922; Kieraj Mumick, 85 Swenson Cir., Berkeley Heights, NJ (US) 07922

( * ) Notice: Subject to any disclaimer, the term of this patent is extended or adjusted under 35 U.S.C. 154(b) by 288 days.

(21) Appl. No.: 12/217,502

(22) Filed: Jul. 3, 2008

(65) Prior Publication Data

US 2010/0002379 A1    Jan. 7, 2010

(51) Int. Cl.
*G06F 1/16* (2006.01)
(52) U.S. Cl. .............. 361/679.59; 361/679.09; 361/679.27; 248/616
(58) Field of Classification Search ............ 361/679.59
See application file for complete search history.

(56) References Cited

U.S. PATENT DOCUMENTS

| | | | | |
|---|---|---|---|---|
| 4,951,241 A | * | 8/1990 | Hosoi et al. | 361/679.09 |
| 4,958,889 A | * | 9/1990 | Boyle et al. | 361/679.41 |
| 5,111,361 A | * | 5/1992 | Kobayashi | 361/679.44 |
| 5,297,003 A | * | 3/1994 | Nomura et al. | 361/679.12 |
| 5,469,327 A | * | 11/1995 | Cheng | 361/679.55 |
| 5,823,504 A | * | 10/1998 | Kuwajima | 248/685 |
| 5,918,957 A | * | 7/1999 | Bovio et al. | 312/223.2 |
| 6,053,589 A | * | 4/2000 | Lin | 312/271 |
| 7,108,234 B2 | * | 9/2006 | Ritchey et al. | 248/118.1 |
| D559,850 S | * | 1/2008 | Lye | |
| 7,415,108 B2 | * | 8/2008 | Toh | 379/445 |
| 7,566,043 B2 | * | 7/2009 | Chen | 248/616 |

* cited by examiner

*Primary Examiner*—Jayprakash N Gandhi
*Assistant Examiner*—Anthony Q Edwards (57) ABSTRACT

A computer includes: computer body enclosing computational circuitry and having a bottom surface; a keyboard disposed on an upper portion of the computer body; a cover supporting a monitor, the cover coupled to the computer body so as to be rotatable about a first axis in relation to the computer body, the first axis being disposed rearwardly of the keyboard; a support member coupled to the computer body so as to be rotatable about a second axis in relation to the computer body, between an open position and closed position, the second axis being parallel to the first axis, the support member including an upper portion and a lower portion, wherein the support member, when rotated into a closed position, is parallel to the bottom surface of the computer body, the support member, when rotated into an open position, extends downwardly from the bottom surface of the computer body, the support member is linearly extendable in a radial direction with respect to the rotation of the support member between a non-extended position and a fully extended position, the height being extendable by moving the lower portion with respect to the upper portion, and the support member includes an expandable portion disposed between the upper portion and the lower portion, the expandable portion spanning a gap between the upper portion and the lower portion when the support member is in the non-extended position and when the support member is in the fully extended position.

3 Claims, 9 Drawing Sheets

LAPTOP STAND

FIELD OF THE INVENTION

The present invention relates generally to a stand for a laptop computer.

BACKGROUND INFORMATION

When a typical laptop computer is placed on a surface, the keyboard of the computer is substantially parallel to the surface. Since many surfaces, i.e., the tops of tables or desks, are horizontal, this results in the keyboard also being horizontal. However, an upwardly sloped keyboard may provide a more ergonomic typing experience, possibly reducing fatigue and lowering the risk of carpal tunnel syndrome.

U.S. Pat. No. 7,108,234 illustrates a keyboard tilting mechanism. However, this tilting mechanism is bulky and not particularly suited for laptop computers.

U.S. Design Pat. No. D559,850 shows a laptop stand. This stand has considerable size, which reduces portability, and does not appear to allow any angle adjustment.

SUMMARY

According to an example embodiment of the present invention, a laptop stand is attached to the back left and right corners of a laptop computer. These stands may allow the laptop computer to be supported such that the keyboard is sloped at about 25 to about 40 degree angle depending on the individual preference.

According to an example embodiment of the present invention, a computer includes a computer body enclosing computational circuitry and having a bottom surface, a keyboard disposed on an upper portion of the computer body, a cover supporting a monitor, the cover coupled to the computer body so as to be rotatable about a first axis in relation to the computer body, the first axis being disposed rearwardly of the keyboard, and a support member coupled to the computer body so as to be rotatable about a second axis in relation to the computer body, between an open position and closed position, the second axis being parallel to the first axis, the support member including an upper portion and a lower portion. The support member, when rotated into a closed position, may be parallel to the bottom surface of the computer body. The support member, when rotated into an open position, may extend downwardly from the bottom surface of the computer body. The support member may be linearly extendable in a radial direction with respect to the rotation of the support member between a non-extended position and a fully extended position, the height being extendable by moving the lower portion with respect to the upper portion. The support member may include an expandable portion disposed between the upper portion and the lower portion, the expandable portion spanning a gap between the upper portion and the lower portion when the support member is in the non-extended position and when the support member is in the fully extended position.

DETAILED DESCRIPTION

Figure 1:
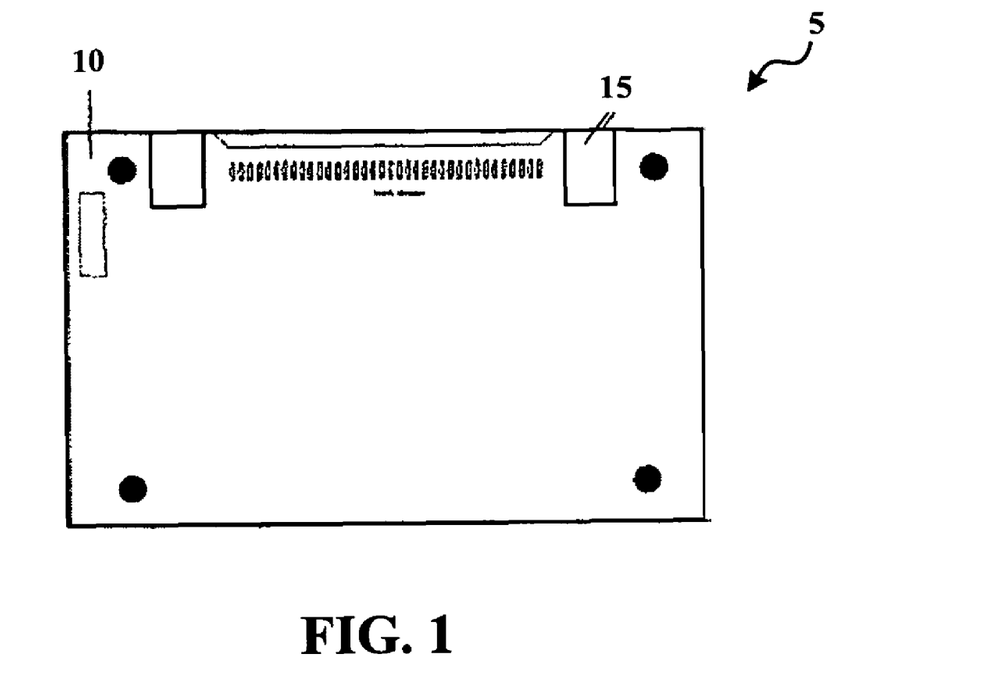
FIG. 1 shows a bottom view of a laptop computer according to an example embodiment of the present invention.

FIG. 1 shows a bottom view of a laptop computer 5 according to an example embodiment of the present invention. The laptop computer 5 has, on bottom side 10, a pair of legs 15 in a folded, or closed, position.

Figure 2:
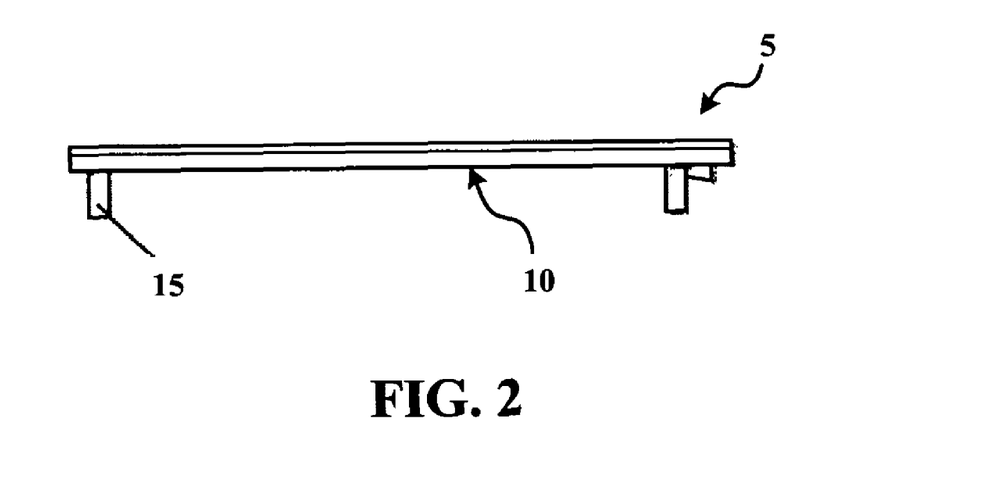
FIG. 2 shows a back view of the laptop computer of FIG. 1.

FIG. 2 shows a back view of the laptop computer 5 of FIG. 1 with the legs 15 in an open position. In this position, the legs provide an elevated support to the rear portion of the computer. This allows the keyboard of the computer to be supported at an angle, e.g., about 25 to about 40 degrees from horizontal when the laptop computer is placed on a flat surface, preferably about 30 to about 35 degrees, most preferably about 33 degrees. As shown in FIG. 2, the laptop computer 5 is closed, i.e., folded shut to conceal the monitor and keyboard (not shown). This angled position may allow for a more ergonomic typing position in comparison to flat keyboard.

Figure 3:
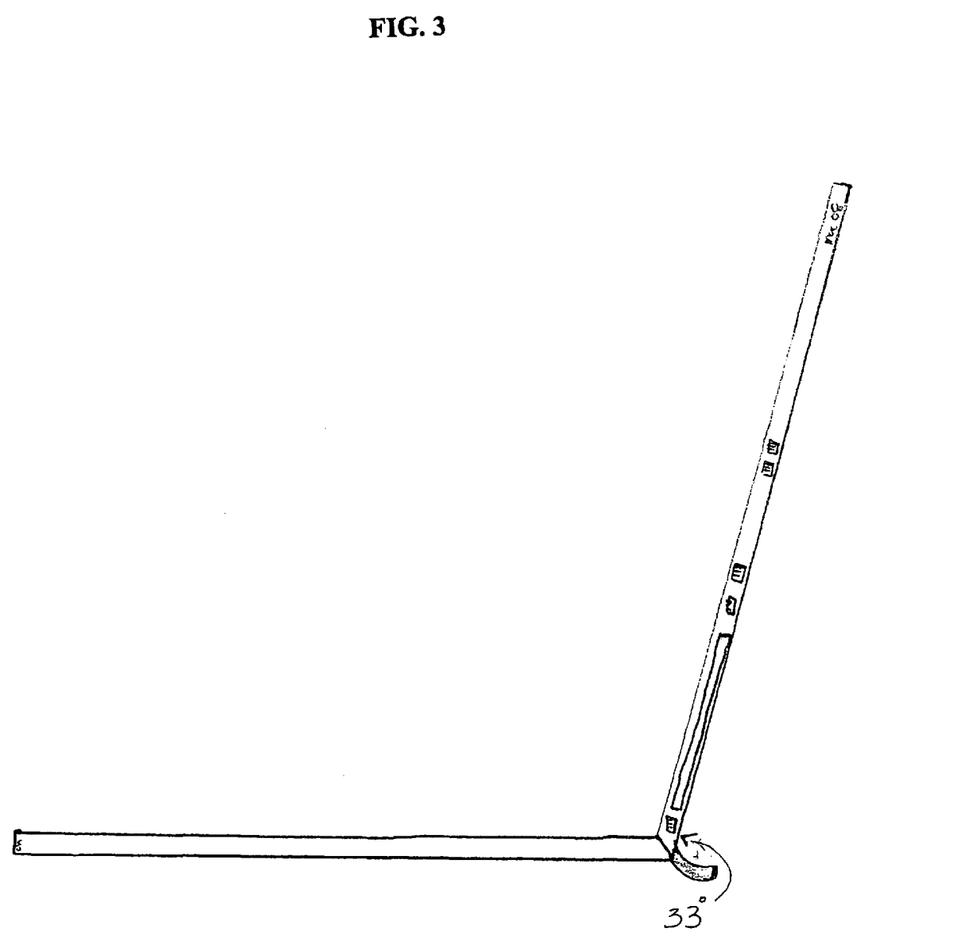
FIG. 3 shows a left side view of the laptop computer of FIG. 1.

FIG. 3 shows a left side view of the laptop computer 5 of FIG. 1, with the laptop opened to reveal the keyboard and monitor. As shown, the laptop computer has a very slim profile. The legs 15 do not adversely affect the slim form factor of the computer due to their slim side profile, which consumes little space when the legs are folded into the closed position. In this regard, the body of the laptop computer 5 has recess that allow the legs 15 to be folded into the closed position so that they do not protrude below the plane of the bottom surface 10.

Figure 4:
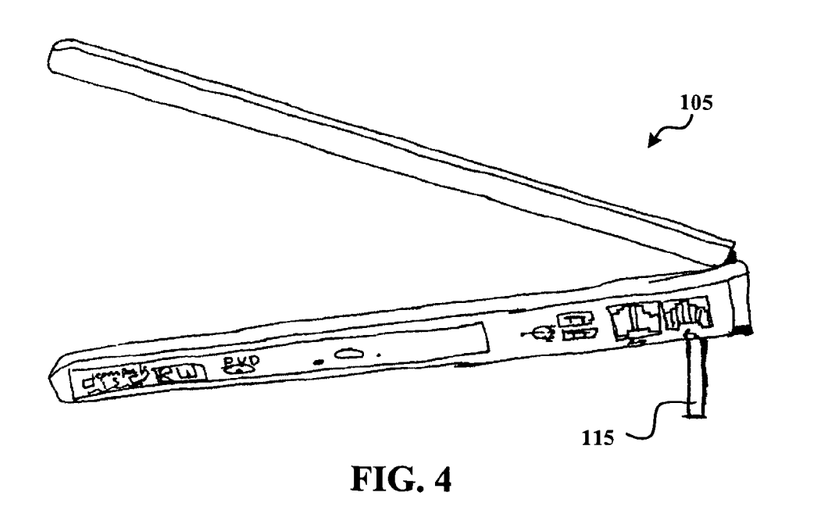
FIG. 4 shows a right side view of a laptop computer according to an example embodiment of the present invention.
Figure 5:
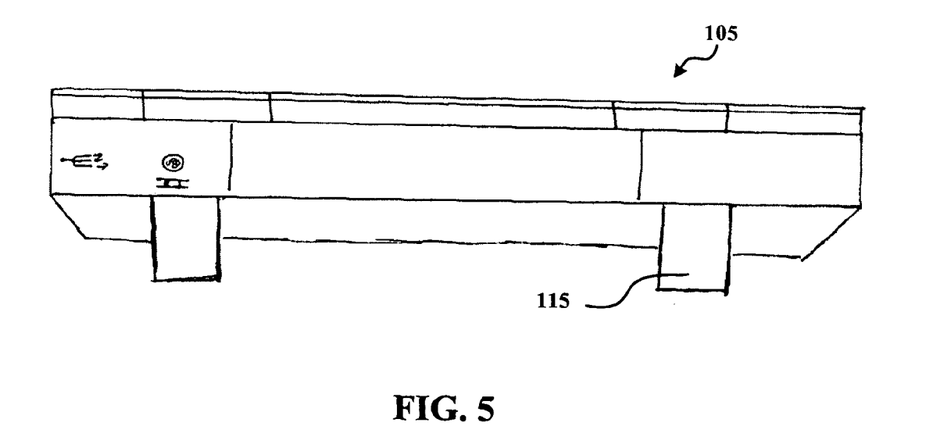
FIG. 5 shows a back view of the laptop computer shown in FIG. 4.

FIGS. 4 and 5 show a right side view and a back view, respectively, of a laptop computer 105 according to an example embodiment of the present invention. The laptop 105 has a pair of foldable legs 115 that fold downwardly into an open position in an analogous manner to the legs 15 of laptop computer 5 discussed above. The extent to which the legs 115 are folded when in the open position may be constant or adjustable. For example, the laptop may have detents that allow the legs to have multiple stable positions. In this manner the angle of the keyboard may be adjusted depending on the extent to which the legs are folded.

Figure 6:
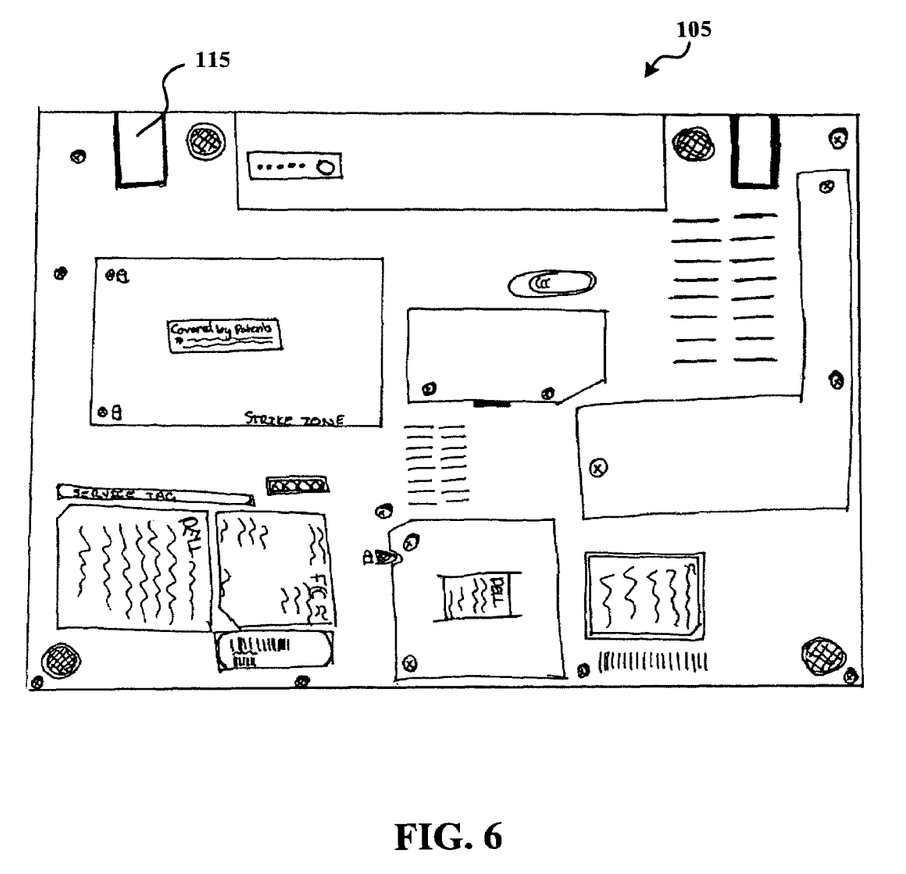
FIG. 6 shows a bottom view of the laptop computer shown in FIG. 4.

FIG. 6 shows a bottom view of the laptop computer 105 when the legs 115 are folded into the closed position.

Figure 7:
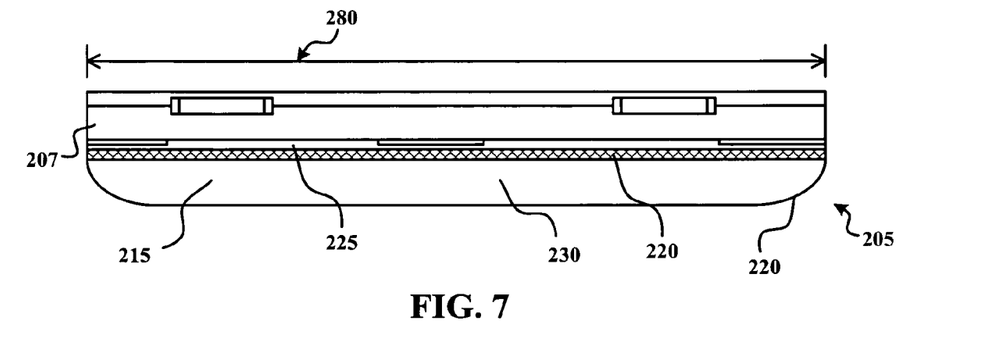
FIG. 7 shows a back view of a laptop computer according to an example embodiment of the present invention.
Figure 8:
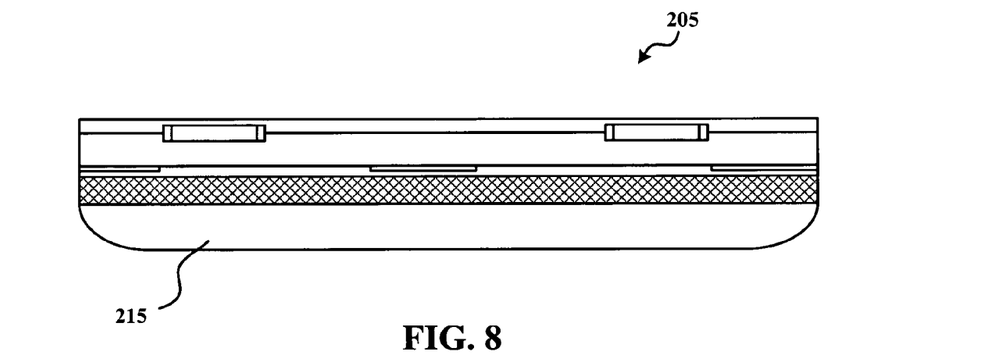
FIG. 8 shows a back view of the laptop computer shown in FIG. 7.
Figure 9:
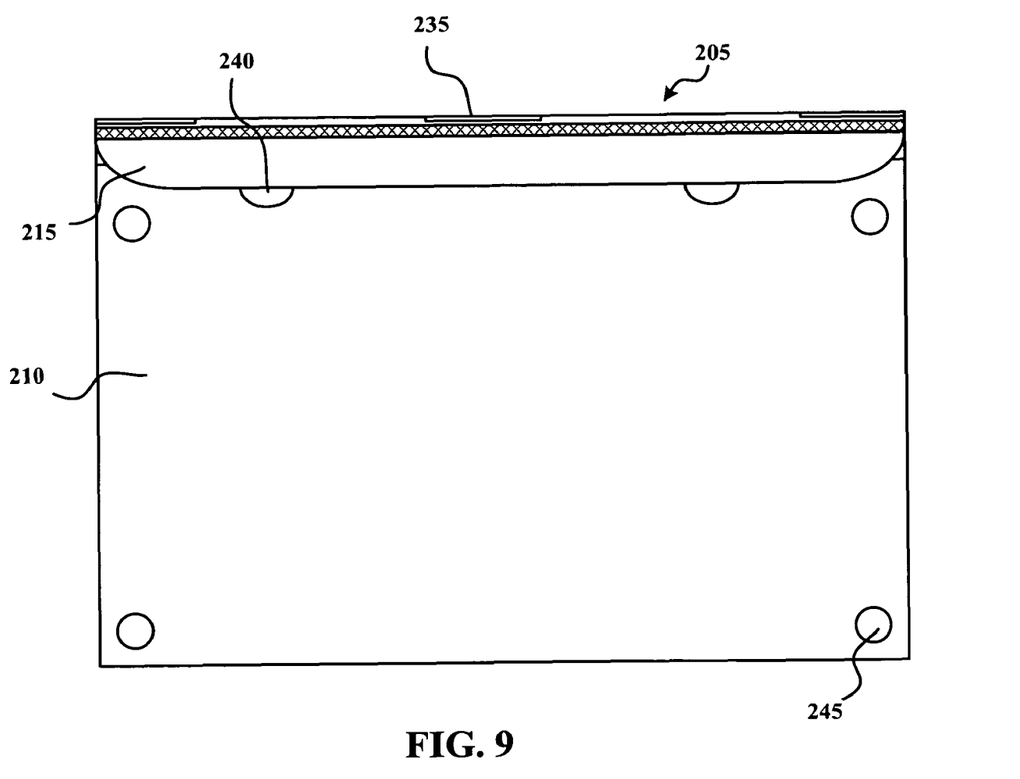
FIG. 9 shows a bottom view of the laptop computer shown in FIG. 7.

FIG. 7 shows a back view of a laptop computer 205 according to an example embodiment of the present invention. The computer 205 has a computer body 207 that contains computational circuitry. The laptop computer 205 includes a folding support member 215 that performs an analogous function to the legs 15 and 115 described above. That is, the folding support member 215, folds downwardly away from the laptop body 207 to provide a raised rear support in order to support the keyboard in order to provide a typing surface that is at an angle, e.g., about 25 to 40 degrees from a flat surface on which the laptop computer may be placed. As shown, for example, in FIG. 10, the folding support member 215 is foldable into a closed position such that the folding support member 215 does not extend below the plane of the bottom surface 210 of the laptop body 207. The folding support member 215 includes an expandable portion 220, disposed between an upper portion 225 and a lower portion 230, that allows the height of the folding support member 215 to expand. The height may be extendable by any appropriate mechanism, e.g., the lower portion may have protrusions that slide within grooves or slots, or in any other suitable manner. The expandable portion 215 may include an elastic or soft material and/or be foldable in an accordian-like manner and enclose or seal the space between the upper portion 225 and the lower portion 230, thus potentially preventing any contaminants, e.g., dust or dirt, from contacting the sliding mechanism, which is contained in the interior of the folding support member 215. The height may be continually extendable or may have predefined heights at which the folding support member may be stably arranged. These heights may be defined, for example, by a series of detents between the upper portion 225 and the lower portion 230. As shown in FIG. 7, the folding support member 215 is not extended, i.e., the folding support member 215 is at a minimum height. FIG. 8 shows a back view of the laptop computer 205 when the folding support member 225 is extended to a maximum height. When the folding support member 225 is at the minimum height it is foldable into a closed position, as shown in FIG. 9, by rotating around hinges 235. The folding support member 225 may snap into place. The laptop computer 215 has two recesses 240 that allow a user to pull the support member 225 into the open position when the support member is folded flush to the bottom surface 210 of the laptop computer 205. Although the computer 205 has two recesses, any number of recess may be used including a single recess. The laptop computer 215 also has four feet 245 that may be formed from a slip-resistant material, e.g., rubber.

Figure 10:
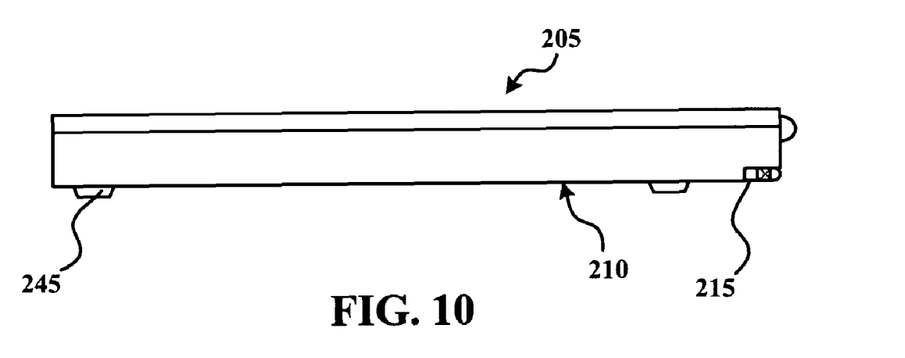
FIGS. 10 and 11 show left side views of the laptop computer shown in FIG. 7.
Figure 11:
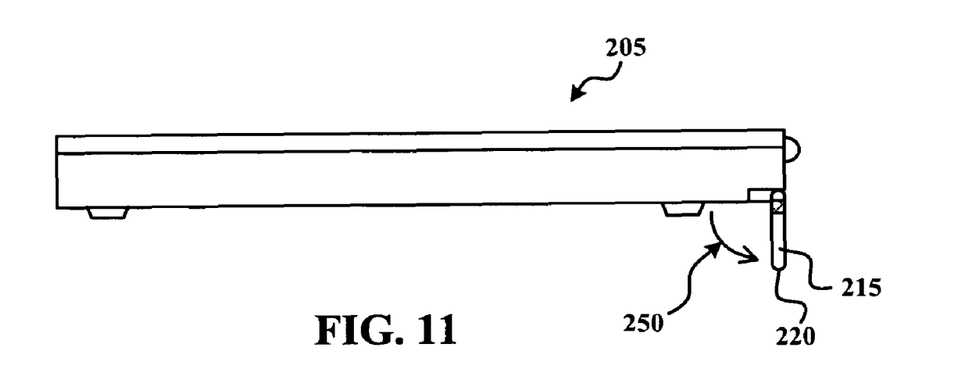

FIG. 11 shows how the folding support member 215 folds in the direction indicated by arrow 250 from the closed position shown in FIG. 10 into the open position shown in FIG. 11.

Figure 12:
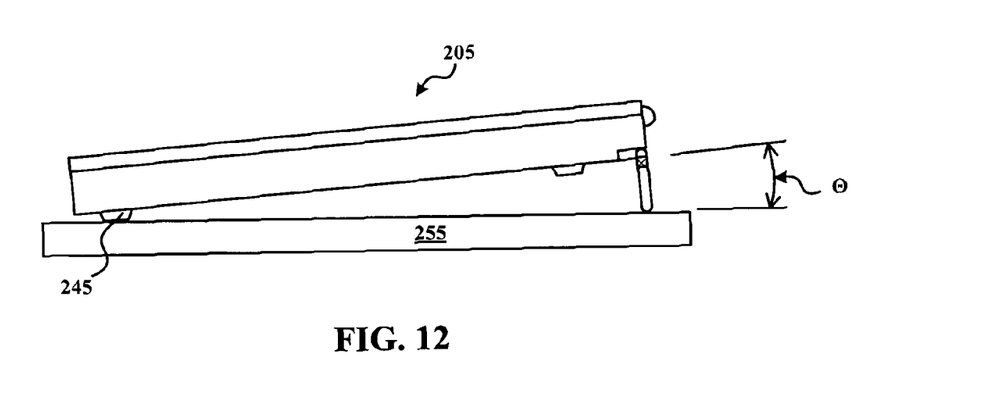
FIGS. 12 to 14 show left side views of the laptop computer shown in FIG. 7 when placed on a surface.
Figure 13:
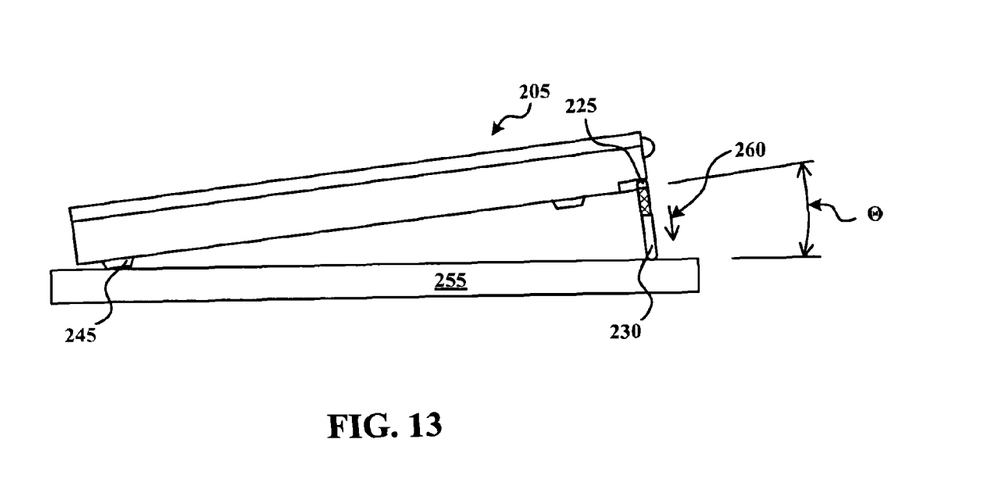
Figure 14:
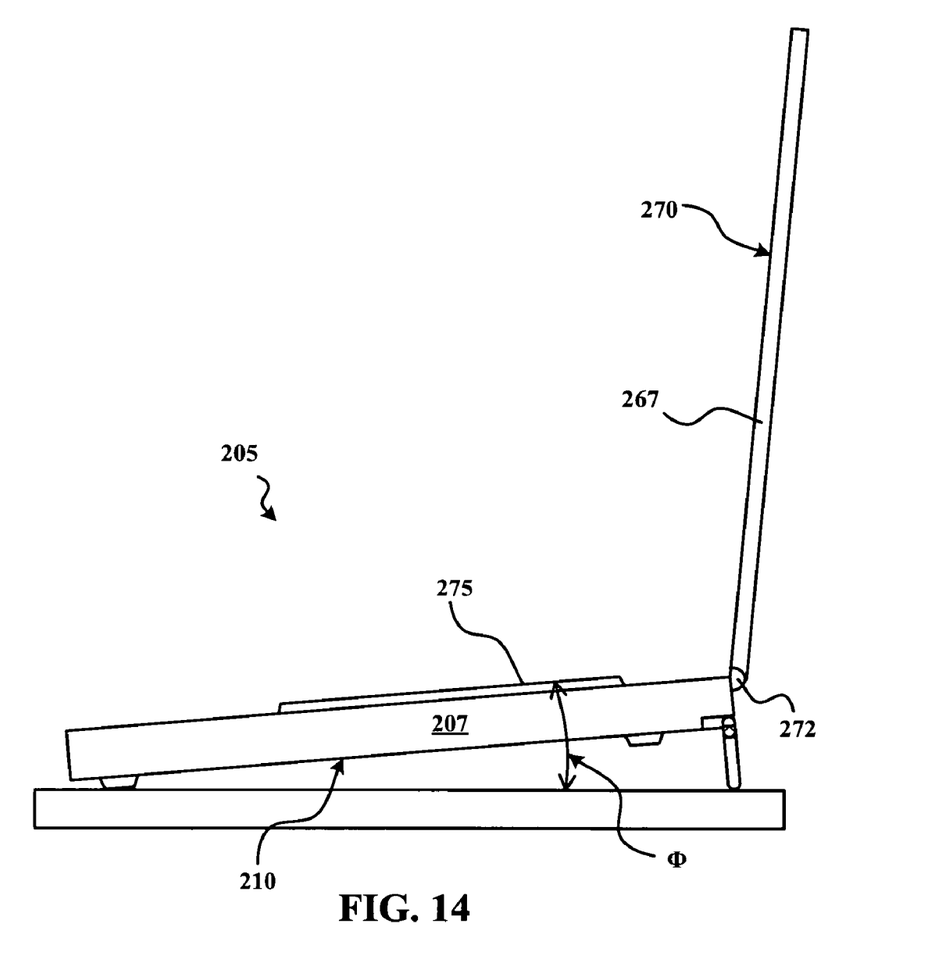

FIGS. 12 to 14 shows the laptop computer 205 left side views of the laptop computer 205 when placed on a flat surface 255 with the foldable support member 215 in the open position. As shown in FIG. 12, the foldable support member 215 is in a non-extended position, i.e., the height of the foldable support member 215 is at a minimum. In this position, the computer is inclined at an angle Θ with respect to the surface 255.

The foldable support member 215 may be extendable such that when in the non-extended position, as shown in FIG. 12, the angle Θ is approximately 25 degrees and when in the fully extended position, as shown in FIG. 13, the angle Θ is approximately 35 degrees. However, any suitable range of values for the range of angle Θ may be provided. As shown in FIG. 13, the lower portion 230 extends in the direction of arrow 260 away from the upper portion 225 in order to extend into the fully extended position as shown. While the rear portion of the computer 205 is raised and supported by the foldable support member 215, the front portion rests on the front pair of feet 245. Like the feet 245, the lower portion 230 may include a slip resistant surface, e.g., rubber. Further, the lower portion 230 may include a soft material such that the folding support member 215 is more comfortable when placed on a user's lap. In this regard, referring for example to FIG. 11, the lower portion 230 has a rounded side profile 220. Likewise, referring for example to FIG. 7, the lower portion 230 has a rounded rear profile. In this regard the lower portion does not have any sharp corners or edges, thus allowing for a high level of comfort, e.g., when the laptop computer 205 is placed in a users lap with the foldable support member 215 in the open position. Further adding to the ergonomic quality of the computer 205 is that, referring for example to FIG. 7, the foldable support member 215 extends across substantially the entire width 280 of the laptop. This may reduce pressure points on a user's body and may provide for increased stability.

FIG. 14 shows a side view of the laptop computer 205 in a similar arrangement to that shown in FIG. 12, except that the cover 267 is opened so as to expose the monitor surface 270 and the keyboard 275. The cover rotates in relation to the computer body 207 about a cover hinge 272. In this regard, the axis of rotation about the cover hinge 272 is parallel to the axis about which the foldable support member 215 rotates with respect to the computer body 207. As shown, the keyboard is inclined at an angle Φ that is essentially the same as the angle Θ, since the keyboard is substantially parallel to the bottom surface 210 of the computer body 207. The keyboard may be non-parallel to the bottom surface. Regardless, the support member 215 may be arranged so that the range of heights between the non-extended position (see FIG. 7) and fully extended position (see FIG. 8) allows for the angle Θ of the keyboard to fall within a desired range, e.g., 25 to 30 degrees.

As shown in the Figures, the foldable support member 215 is substantially parallel to the bottom surface 210 of the laptop body 207.

Although the present invention has been described with reference to particular examples and exemplary embodiments, it should be understood that the foregoing description is in no manner limiting. Moreover, the features described herein may be used in any combination.

What is claimed is:

1. A computer comprising:

a computer body enclosing computational circuitry and having a bottom surface;

a keyboard disposed on an upper portion of the computer body;

a cover supporting a monitor, the cover coupled to the computer body so as to be rotatable about a first axis in relation to the computer body, the first axis being disposed rearwardly of the keyboard; and a support member coupled to the computer body so as to be rotatable about a second axis in relation to the computer body, between an open position and closed position, the second axis being parallel to the first axis, the support member including an upper portion and a lower portion, wherein the support member, when rotated into a closed position, is parallel to the bottom surface of the computer body, the support member, when rotated into an open position, extends downwardly from the bottom surface of the computer body, the support member is linearly extendable in a radial direction with respect to the rotation of the support member between a non-extended position and a fully extended position, the support member height being extendable by moving the lower portion with respect to the upper portion, and the support member includes an expandable portion disposed between the upper portion and the lower portion, the expandable portion spanning a gap between the upper portion and the lower portion when the support member is in the non-extended position and when the support member is in the fully extended position.

2. The computer of claim 1, wherein said keyboard of the computer is supported at an angle of about 25 degrees to about 40 degrees from horizontal when the laptop computer is placed on a flat surface and said support member is rotated into an open position.

3. The computer of claim 2, wherein said keyboard of the computer is supported at an angle of about 30 degrees to about 35 degrees from horizontal when the laptop computer is placed on a flat surface and said support member is rotated into an open position.

* * * * *